United States Patent Office

3,163,213
Patented Dec. 29, 1964

3,163,213
WATERFLOODING METHOD OF SECONDARY RECOVERY USING LIQUID HYDROGEN SULPHIDE
George G. Bernard, Crystal Lake, Ill., assignor to The Pure Oil Company, Chicago, Ill., a corporation of Ohio
No Drawing. Filed Nov. 9, 1961, Ser. No. 151,163
4 Claims. (Cl. 166—9)

This invention relates to an improved method for the recovery of oil from subterranean reservoirs. In particular, this invention relates to an improved solvent-waterflood process by which increased quantities of oil may be recovered at minimum expense.

It is well known that additional quantities of petroleum may be recovered from depleted reservoirs by injecting fluid into the reservoirs through one or more input wells. Water is used extensively as the injection fluid, since it is cheap, abundant, and effective. It is recognized, however, that the injection of water, commonly known as waterflood, results in the production of only a portion of the oil remaining in the reservoir at the time waterflood is commenced. The prior art has recognized that by the injection of solvents ahead of the floodwater, the recovery of petroleum may be enhanced. In one method, the solvent may be liquified low molecular-weight hydrocarbon, the function of which is to reduce the viscosity of the crude oil in the reservoir. In another method, an amphipathic solvent is injected before the floodwater, the function of the amphipathic solvent being to dissolve in both the petroleum and the injected water, so that a single-phase displacement is achieved, whereby no interface between the miscible liquids exists in the reservoir. In another modification known to the prior art, a liquefied low-molecular-weight hydrocarbon is first injected to reduce the viscosity of the petroleum and an amphipathic solvent is injected to provide a miscible transition zone between the petroleum and the floodwater which is injected to drive the solvents through the formation.

Such prior art methods are highly efficient where the amphipathic solvent selected is in fact completely miscible with both the petroleum phase in the reservoir and the injected floodwater. Unfortunately, there are few solvents which are in fact miscible with petroleum and with water, and these materials are extremely expensive, with the result that industry has not considered miscible-displacement, waterflood processes attractive from an economic point of view.

It is an object of this invention to provide an improved process for the recovery of petroleum from subterranean reservoirs. Another object of this invention is to provide a method for the recovery of petroleum from subterranean reservoirs whereby high efficiency of recovery is achieved, but the necessity for employing solvents miscible with both oil and water is avoided. Still another object of this invention is to provide a method whereby recoveries equivalent to those obtainable by miscible-displacement processes can be achieved with the use of less-expensive solvents which need not be miscible with petroleum.

Briefly, the method of this invention comprises injecting through an input well into the subterranean formation a first slug of liquefied hydrogen sulfide, then injecting into the formation a slug of water-miscible, but not necessarily oil-miscible, partially oxygenated hydrocarbons, and then injecting floodwater to drive the hydrogen sulfide and partially oxygenated hydrocarbons toward a producing well. Petroleum is recovered from the producing wells until the water-to-oil ratio reaches a level at which further production is not economically practical.

In carrying out the method of this invention, a quantity of liquefied hydrogen sulfide amounting to 0.03 to 0.20 reservoir pore volume is first injected. The exact quantity of hydrogen sulfide injected will vary from reservoir to reservoir, depending on the oil saturation of the reservoir before treatment. Quantities within the aforedefined range will be satisfactory, and in most reservoirs the quantity of hydrogen sulfide injected will be within the lower portion of the range, preferably about 0.05 reservoir pore volume. The hydrogen sufide must be injected under sufficient pressure to maintain it as a liquid in the reservoir, and the subsequently injected floodwater will be injected under sufficient pressure to maintain the hydrogen sulfide as a liquid. Very high pressures are not required, since in most reservoirs the hydrogen sulfide will remain a liquid under pressures as low as 400 p.s.i. Higher injection pressures may be employed, but increasing the pressure ordinarily will not increase the effectiveness of the treatment. Where desired, back pressure may be maintained on a producing well to control the rate at which the hydrogen sulfide advances through the reservoir.

The second-injected slug must be miscible with the floodwater employed, and with the liquid hydrogen sulfide; it need not be miscible with the petroleum in the reservoir, but must have some solubility in oil, though this solubility need not be great. Materials which are soluble in the petroleum in amounts not less than about one-half volume of solvent in one volume of petroleum may be employed. Thus, inexpensive partially oxidized hydrocarbons, such as methanol, may be employed. Numerous oxygenated hydrocarbons which have sufficient solubility in oil, and are miscible with water, may be employed. Examples of such materials are 1,4-butylene oxide, 1,2-propylene oxide, propionic acid, acetic acid, ethyl alcohol, acetone, and isopropyl alcohol. Also, the raw oxidation products from various prior art hydrocarbon partial oxidation processes may be employed. Such product streams comprise a wide variety of alcohols, aldehydes, ketones, and organic acids, most of which are miscible with water. From an economic point of view, raw oxidation products and methyl alcohol comprise preferred materials. It is contemplated that the oxygenated hydrocarbons employed in the method of this invention will be commercial grade materials, rather than pure chemicals. Thus, the oxygenated hydrocarbons employed, such as methanol, may contain small amounts of other alcohols, and small amounts, not in excess of about 10%, of water.

The effectiveness of the method of this invention has been demonstrated experimentally by a series of floods carried out in packed-sand cores having a length of 30 inches and a diameter of one inch. In each experiment, the pressure and rate of flow through the core were maintained as nearly uniform as practical. In all of the experiments, the water injected contained 15% by weight of sodium chloride, and in each experiment, floodwater injection was continued until oil could no longer be detected in the produced fluids. At this point, the process had reduced the oil content of the core to the greatest extent possible under the specific conditions employed. Thus, a direct comparison of the efficiency of the various processes as set forth in the following table, can be made.

Table 1

| Run No. | Initial Saturation (percent pore volume) Water | Initial Saturation (percent pore volume) Oil | $H_2S$ Slug (percent P.V.) | Methyl Alcohol Slug (percent P.V.) | Oil Recovered (percent OIP) | Remarks |
|---|---|---|---|---|---|---|
| 1 | 19.4 | 80.6 | None | None | 75 | Water alone. |
| 2 | 19.5 | 80.5 | None | 10 | 78 | Alc.+water. |
| 3 | 20.7 | 79.3 | 10 | None | 87 | $H_2S$+water. |
| 4 | 21.8 | 78.2 | 10 | 10 | 94 | $H_2S$+Alc.+water. |
| 5 | 20.7 | 79.3 | 20 | None | 90 | $H_2S$+water. |

It will be observed that the efficiency of the method of this invention, as exemplified by Run No. 4, is much greater than that provided by the use of hydrogen sulfide or methyl alcohol alone. It is apparent that there is a peculiar co-action between the injected materials. It will be observed from a comparison of Runs 1 and 2 that the use of methyl alcohol, prior to floodwater, provides little improvement over the use of floodwater alone. By comparison of Runs 4 and 5, it will be observed that by injecting a total quantity of hydrogen sulfide and methyl alcohol no greater than the total quantity of hydrogen sulfide employed in Run No. 5, a substantial improvement in oil recovery is obtained.

As a specific example of the method of this invention, a reservoir penetrated by five wells, in a five-spot pattern, is treated by injecting into the central well 0.05 pore volume of hydrogen sulfide, 0.05 pore volume of commercial methanol, and floodwater sufficient to drive the injected hydrogen sulfide and methanol to the producing wells. The reservoir temperature is 100° F., and the injection of hydrogen sulfide, methanol, and floodwater is carried out under a pressure of 350 p.s.i. The rate of advance of the injected materials through the formation is about 2 feet per day. Petroleum is recovered from the producing wells until the water-to-oil ratio reaches a value of 10 to 1, at which point it is estimated that 85% of the petroleum previously in place has been recovered.

The embodiments of the invention in which an exclusive property or privilege is claimed are defined as follows:

1. The method of recovering petroleum from subterranean reservoirs penetrated by an input well and a producing well comprising injecting through said input well into said reservoir 0.03 to 0.20 reservoir pore volume of liquid hydrogen sulfide, then injecting 0.03 to 0.20 reservoir pore volume of water-soluble oxygenated hydrocarbon, then injecting floodwater at a pressure in excess of the vapor pressure of hydrogen sulfide at reservoir temperature to drive said hydrogen sulfide and oxygenated hydrocarbon toward a producing well, and recovering petroleum from said producing well.

2. The method in accordance with claim 1 in which said oxygenated hydrocarbon is of the group consisting of methyl, ethyl, and isopropyl alcohols.

3. The method in accordance with claim 2 in which the amount of hydrogen sulfide injected is about 0.05 reservoir pore volume.

4. The method in accordance with claim 3 in which the amount of oxygenated hydrocarbon injected is about 0.05 reservoir pore volume.

References Cited in the file of this patent
UNITED STATES PATENTS

| 2,742,089 | Morse et al. | Apr. 17, 1956 |
| 2,968,350 | Slobod et al. | Jan. 17, 1961 |